Patented June 17, 1924.

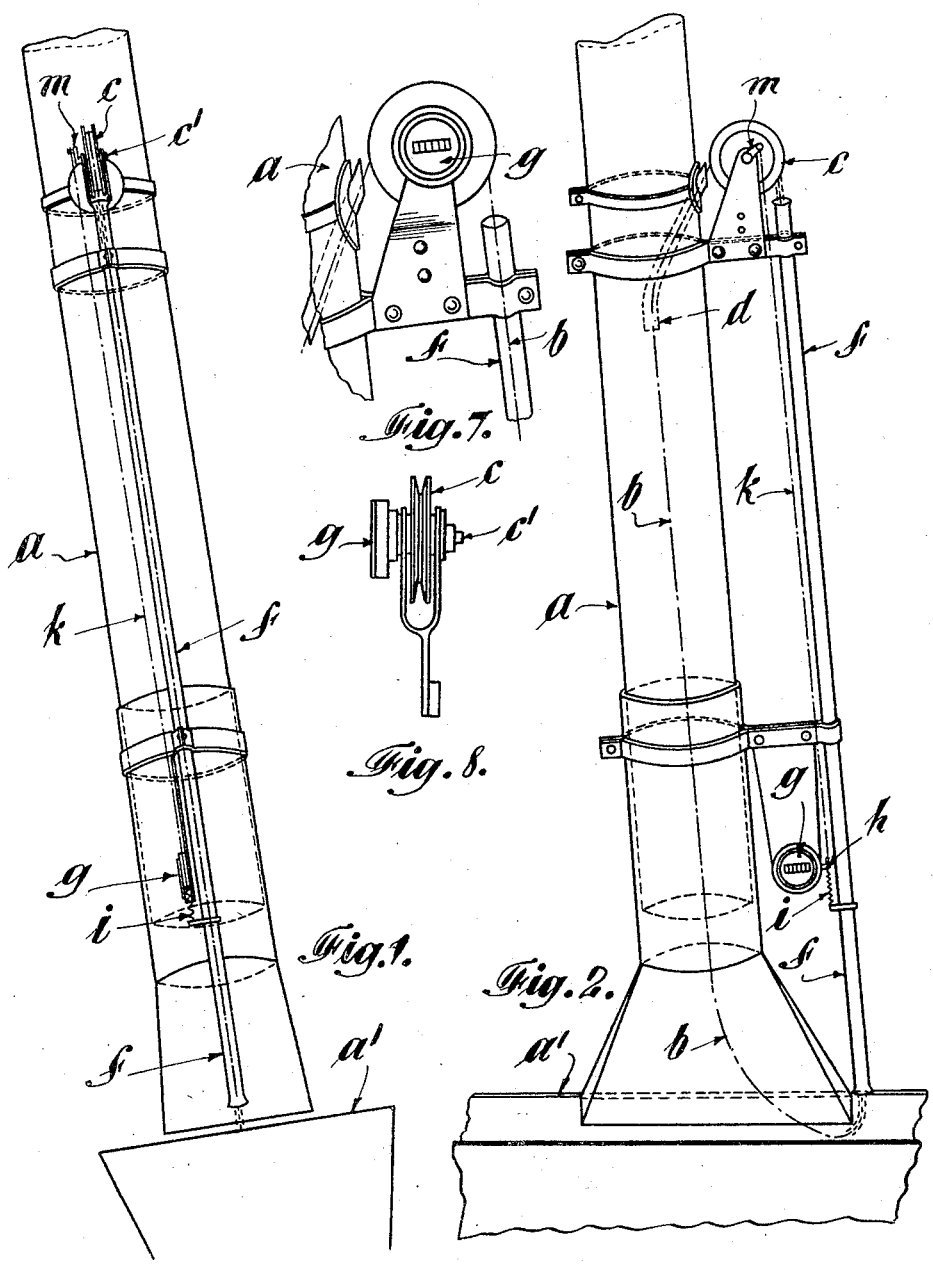

1,498,298

UNITED STATES PATENT OFFICE.

GEORGE WILLIAM PEARSON ROBERTS AND CHARLES GUMMER, OF LONDON, ENGLAND.

MEANS FOR MEASURING COAL, GRANULAR AND OTHER LIKE BULK MATERIAL.

Application filed February 14, 1923. Serial No. 618,999½.

*To all whom it may concern:*

Be it known that GEORGE WILLIAM PEARSON ROBERTS and CHARLES GUMMER, both subjects of the King of Great Britain and Ireland, residing at London, England, have invented new and useful Improvements in and in Means for Measuring Coal, Granular and Other like Bulk Material, of which the following is a specification.

The object of the present invention is to provide for the determination of the rate of delivery of coal, grain, cement or other like loose or granular bulk material to a hopper or other receptacle, in a more accurate and effective manner than heretofore, with the aid of a simple form of apparatus. To this end, the invention consists in causing the material to fill and gravitate down a path, and in so doing to drag or advance endless flexible means part of which extends through and is embedded in the material in such path so that it moves mutually with the material. The movement of the flexible means can then, in known or suitable way, be made use of to indicate by suitable means, the volume of material delivered or the rate of delivery, in any convenient terms, either directly, or after comparison with a table prepared by preliminary trials of the apparatus.

The invention is particularly applicable for use in connection with steam boilers having stokers fed from overhead hoppers, the coal being delivered from any such overhead hopper to a hopper in the boiler front through a chute which may be vertical, or inclined sufficiently to allow of the coal travelling freely down it. In this case, the endless flexible means may take the form of an endless chain passing around a sprocket or pitch wheel at or near the upper end of the chute, and directed, as by a guide pipe, to or near to, the centre of the chute. The return portion of the chain, which is external to the chute, may be protected by a guide pipe or suitable casing. A counter or indicator is employed, adapted to be operated from the chain in any suitable manner, as for instance, by a tappet moved, say in opposition to a spring, by a wire, or other flexible or suitable connector, it may be a rod, periodically displaced by any suitable means, for instance a crank, in accordance with rotation of the sprocket or pitch wheel referred to. Or the counter or indicator may be operated directly from the spindle of the sprocket or pitch wheel, or through the medium of a sprocket or pitch wheel meshing with the chain at or near its lower extremity and external to the chute. The counter or indicator can, by calibration, or by the use of a table, be adapted to give the volume or weight of coal or other material passed in a given time, or passing at any given time, down the chute. The counter or indicator may be driven through means, as for example differential pulleys, to allow for its adjustment to suit varying requirements.

The apparatus can be variously constituted to suit the character of the material being dealt with, and the flexible endless means may be provided with pallets or devices for ensuring that the material shall not advance without producing a corresponding movement of the endless means.

In the accompanying illustrative drawings,

Figs. 1 and 2 are views at right angles to one another showing one construction of measuring means according to the invention applied to a chute through which material to be measured passes.

Figs. 7 and 8 are views at right angles to one another showing a modified construction of counter mechanism.

Fig. 9 shows in side elevation a further modified construction.

Figure 3:
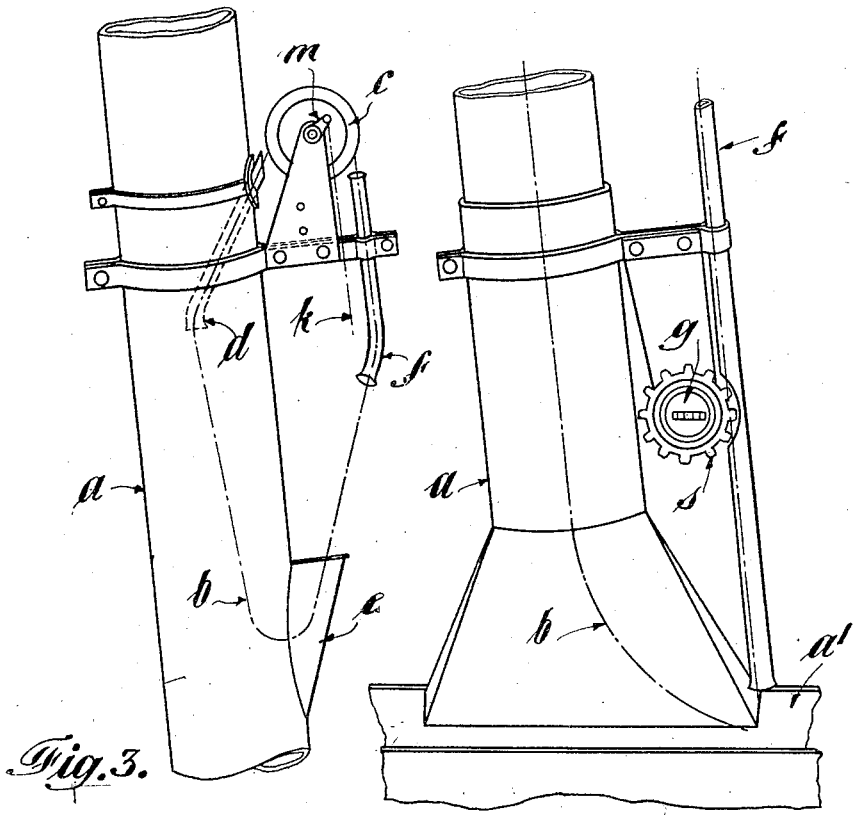
Fig. 3 is a similar view to part of Fig. 2, showing a modified construction.
Figure 4:
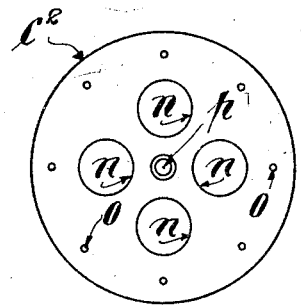
Figs. 4 and 5 are views at right angles to one another showing one construction of sprocket or pitch wheel that may advantageously be used.
Figure 5:
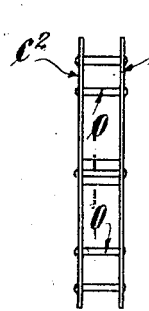

Referring to the drawings, *a* is a chute, which may be either vertical or inclined, through which coal or other material to be measured is allowed to fall into a hopper *a'*. *b* is an endless chain passing around a sprocket, pitch or guide wheel *c* located at or near the upper end of the chute, and directed, as by a guide pipe *d* to the centre of the chute. The chain *b* may pass, as shown in Figs. 1 and 2 to the bottom of the chute, or as shown, in Fig. 3, it may be led out of the chute at a part thereof intermediate of the length of the chute, as through a hopper *e* designed to prevent or minimize escape of material from the chute at this point. The outer or return portion of the chain is, or may be, protected by a guide pipe $f$ through which it passes. $g$ is a counter or indicator adapted to be operated by an arm or tappet $h$ arranged to be moved in opposition to a spring $i$ by a wire $k$ or other suitable connector, it may be a rod, actuated by a crank $m$ fixed to the axle $c'$ of the wheel $c$. According to the construction shown in Figs. 4 and 5, the sprocket or pitch wheel driven by the endless chain $b$ comprises two plates $c^2$, $c^3$ secured together by pins $o$ that may be shouldered in the plate and be riveted over at the ends to give rigidity to the built up wheel. The plate may be provided with holes $n$ to prevent accumulation of dust in the wheel, and to lighten the wheel. $p$ is a central bush also shouldered and firmly fixed in the plates $c^2$, $c^3$ to assist in the formation of a strong and light wheel and by means of which the wheel can be fixed to its spindle $c'$, to one end of which the crank $m$ can be fixed. The pitch of the pins $o$ is such that alternate links of the endless chain $b$ will be flat against the pins and rotate the wheel without slip.

Figure 6:
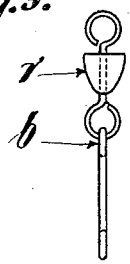
Fig. 6 shows one construction of the flexible endless means upon which the material to be measured acts.

In some cases the endless chain $b$, may, as shown in Fig. 6, be provided with pallets or enlargements $r$ for ensuring that the material to be measured shall not advance without producing a corresponding movement of the chain. The counter or indicator $g$ may, if desired, and as shown in Figs. 7 and 8 be operated directly from the spindle $c'$ of the sprocket or pitch wheel $c$, or as shown in Fig. 9, there may be secured to the counter or indicator $g$ a toothed wheel $s$ adapted to mesh with and be driven from the endless chain at or near its lower portion and external to the chute, the guide pipe $f$ being cut away for the purpose.

The indicator instead of being adapted to indicate the amount of material delivered through the chute, may be constructed and operated after the manner of a speedometer to indicate, in suitable terms, the rate of delivery of the material at any given instant.

What we claim is:

1. In combination, a chute through which coal, cement, granular or other freely flowing substances in bulk may flow, an endless flexible member arranged with part of its length in the chute whereby it may be dragged along by the material, means for guiding and supporting the said endless flexible member, and means operated by said member adapted to show the volume of material delivered, substantially as herein set forth.

2. In combination, a chute down which coal, cement, granular or like freely flowing material in bulk may pass, an endless chain, a sprocket wheel for supporting and guiding said chain near the upper end of the chute, a guide for directing the chain away from the side of and towards, the middle of the chute, the return portion of the chain being outside the chute, and indicating means operated by the sprocket wheel for indicating the volume of material delivered, substantially as herein set forth.

3. In combination, a chute down which coal, cement, granular or like material may flow in bulk, said chute having an opening near its upper end, an endless chain passing through said opening in the chute, and lying with one part in the chute and another part outside the chute, a curved guide pipe for guiding the chain towards the middle of the chute, a guide wheel for supporting the chain, and an indicator operated by the spindle of the guide wheel, substantially as herein set forth.

4. In combination, a chute down which coal, cement, granular or like material may flow in bulk, an endless chain, a guide wheel over which the chain passes, a portion of said chain passing down the chute, and means engaging the chain for indicating the volume of material delivered, substantially as herein set forth.

5. In combination, a chute down or through which coal, cement, granular or similar material in bulk may gravitate or flow, said chute having an opening near its upper end, an endless chain passing through said opening, a guide wheel over which said chain passes, means on the chain whereby the material in the chute may act upon and drag the chain at the same speed, and an indicator driven by said chain or guide wheel for indicating the volume of the material delivered, substantially as herein set forth.

In testimony whereof we have signed our names to this specification.

GEORGE WILLIAM PEARSON ROBERTS.
CHARLES GUMMER.